(12) United States Patent
Ham

(10) Patent No.: US 7,485,178 B2
(45) Date of Patent: Feb. 3, 2009

(54) INK COMPOSITION FOR INKJET RECORDING, INK CARTRIDGE INCLUDING THE INK COMPOSITION, AND INKJET RECORDING APPARATUS INCLUDING THE INK CARTRIDGE

(75) Inventor: Cheol Ham, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 11/950,025

(22) Filed: Dec. 4, 2007

(65) Prior Publication Data
US 2008/0289536 A1 Nov. 27, 2008

(30) Foreign Application Priority Data
May 23, 2007 (KR) .................. 10-2007-0050254

(51) Int. Cl.
*C09D 11/00* (2006.01)
*C09D 11/02* (2006.01)
*B41J 2/01* (2006.01)

(52) U.S. Cl. .............. 106/31.43; 106/31.46; 106/31.47; 106/31.48; 106/31.75; 106/31.76; 106/31.77; 106/31.78; 347/100

(58) Field of Classification Search ............... 106/31.43, 106/31.46, 31.47, 31.49, 31.75, 31.76, 31.77, 106/31.78; 347/100
See application file for complete search history.

(56) References Cited

U.S. PATENT DOCUMENTS 6,623,915 B1 * 9/2003 Haye et al. .................. 430/490

2006/0216421 A1 * 9/2006 Hayashi et al. .............. 427/282
2007/0040881 A1 * 2/2007 Ham et al. ................ 106/31.47
2007/0204761 A1 * 9/2007 Sugimoto ................. 106/31.58

FOREIGN PATENT DOCUMENTS

| JP | 8-337747 | 12/1996 |
|---|---|---|
| JP | 2002-302632 | 10/2002 |

OTHER PUBLICATIONS

English translation of JP 2002/302632, 10/2002.*

* cited by examiner

*Primary Examiner*—Helene Klemanski
(74) *Attorney, Agent, or Firm*—Stanzione & Kim, LLP

(57) ABSTRACT

An ink composition for inkjet recording including a compound represented by

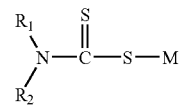

where $R_1$ and $R_2$ are each independently, hydrogen, a $C_1$-$C_{20}$ substituted or unsubstituted alkyl, a $C_2$-$C_{20}$ substituted or unsubstituted alkenyl, a $C_2$-$C_{20}$ substituted or unsubstituted alkynyl, a $C_6$-$C_{20}$ substituted or unsubstituted aryl, a $C_7$-$C_{20}$ substituted or unsubstituted arylalkyl, a $C_2$-$C_{20}$ substituted or unsubstituted cyclic alkyl, or a hetero atom-containing cyclic alkyl and M is hydrogen or Na, K, Li, or an ammonium ion. The ink composition may further include a coloring agent and water, so that the ink composition prevents formation of depositions therein over time to obtain high storage stability and good ejection properties.

12 Claims, 2 Drawing Sheets

INK COMPOSITION FOR INKJET RECORDING, INK CARTRIDGE INCLUDING THE INK COMPOSITION, AND INKJET RECORDING APPARATUS INCLUDING THE INK CARTRIDGE

CROSS-REFERENCE TO RELATED APPLICATIONS

This application claims priority under 35 U.S.C. §119(a) from Korean Patent Application No. 10-2007-0050254, filed on May 23, 2007, in the Korean Intellectual Property Office, the disclosure of which is incorporated herein in its entirety by reference.

BACKGROUND OF THE INVENTION

1. Field of the Invention

The present general inventive concept relates to an ink composition for inkjet recording, an ink cartridge including the ink composition, and an inkjet recording apparatus including the ink cartridge, and more particularly, to an ink composition for inkjet recording which can prevent formation of depositions therein over time in a thermal-type inkjet printer to obtain high storage stability and good ejection properties, an ink cartridge including the ink composition, and an inkjet recording apparatus including the ink cartridge.

2. Description of the Related Art

Inkjet recording can be performed with low noise and at high speed. As such, inkjet recording methods are attracting more and more attention. In inkjet printers, a highly flowable liquid is ejected from a thin nozzle to be recorded on a medium. Inkjet printers are categorized into on-demand ejection type inkjet printers and continuous ejection type inkjet printers.

An ink for high-speed inkjet printers should be able to be manipulated into ink droplets having a uniform size, and should be able to be ejected at a uniform speed and in a uniform direction through a nozzle. When inkjet recording is performed many times, a heater of a recording head may be destroyed, and as such, the ink cannot be ejected, or depositions can build up on the heater, and thus thermal energy of the heat cannot be efficiently transferred. In addition, there is a need to reduce a number of cleaning processes required by preventing formation of depositions on and/or within the nozzles. Furthermore, ink should be stably stored. If ink is unstably stored, ink injection is unstable and thus, images to be formed can be skipped or recorded in a lower than desired concentration.

Japanese Patent Laid-open Publication No. hei 8-337747 discloses an aqueous ink having storage stability and ejection stability containing an inorganic sulfate that makes a polyvalent metal ion soluble in water. Specifically, ink ejection stability can be obtained in such a manner that a metal ion in the ink is captured by a sulfuric ion to prevent formation of a low-soluble complex due to coordination of the metal ion with an anion, such as a carboxylic acid induced from an additive.

According to another method of obtaining ink injection stability, an impurity, such as a metal ion, generated when a dye is synthesized, can be removed from the dye. However, even when an impurity, such as a metal ion, is removed by refining of the ink, depositions of the dye are generated because thermal decomposition of dye in the ink cannot be avoided.

According to another method to improve long-term storage stability of an aqueous ink, a chelating agent can be added to ink for inkjet recording to mask a metal ion in dye so that blockages in printing heads due to a metal ion can be prevented. In general, an ethylenediamine tetraacetic acid (EDTA) salt or the like are usually used as a chelating agent. When the concentration of such a chelating agent is high, a surface layer of a heater gradually corrodes, and thus a thickness of the surface layer is reduced, and after a predetermined time period, the surface layer corrodes completely and the heater is short-circuited.

Accordingly, the techniques described above are not sufficient to completely prevent formation of depositions.

SUMMARY OF THE INVENTION

The present general inventive concept provides an ink composition for inkjet recording which can prevent formation of depositions therein over time in a thermal-type inkjet printer to obtain high storage stability and a high ejection effect, an ink cartridge including the ink composition and the ink recording apparatus including the ink cartridge.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an ink composition for inkjet recording including a coloring agent, water, and a compound represented by Formula 1, wherein an amount of the compound represented by Formula 1 is in a range from 0.0001-0.005 parts by weight based on 1 part by weight of the coloring agent:

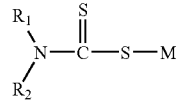

Formula 1 where $R_1$ and $R_2$ are each independently, hydrogen, a $C_1$-$C_{20}$ substituted or unsubstituted alkyl, a $C_2$-$C_{20}$ substituted or unsubstituted alkenyl, a $C_2$-$C_{20}$ substituted or unsubstituted alkynyl, a $C_6$-$C_{20}$ substituted or unsubstituted aryl, a $C_7$-$C_{20}$ substituted or unsubstituted arylalkyl, a $C_2$-$C_{20}$ substituted or unsubstituted cyclic alkyl, or a hetero atom-containing cyclic alkyl; and M is hydrogen or Na, K, Li, or an ammonium ion.

The foregoing and/or other aspects and utilities of the general inventive concept may also be achieved by providing an inkjet cartridge including a storing portion to store ink, and the ink including a coloring agent, water, and a compound represented by Formula 1, wherein an amount of the compound represented by Formula 1 is in a range from 0.0001 to 0.005 parts by weight based on 1 part by weight of the coloring agent

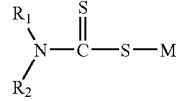

Formula 1 where $R_1$ and $R_2$ are each independently, hydrogen, a $C_1$-$C_{20}$ substituted or unsubstituted alkyl, a $C_2$-$C_{20}$ substituted or unsubstituted alkenyl, a $C_2$-$C_{20}$ substituted or unsubstituted alkynyl, a $C_6$-$C_{20}$ substituted or unsubstituted aryl, a $C_7$-$C_{20}$ substituted or unsubstituted arylalkyl, a $C_2$-$C_{20}$ substituted or unsubstituted cyclic alkyl, or a hetero atom-containing cyclic alkyl and M is hydrogen or Na, K, Li, or an ammonium ion.

The foregoing and/or other aspects and utilities of the general inventive concept may also be achieved by providing an inkjet recording apparatus including an ink cartridge to store and discharge ink, and the ink including a coloring agent, water, and a compound represented by Formula 1, wherein an amount of the compound represented by Formula 1 is in a range from 0.0001 to 0.005 parts by weight based on 1 part by weight of the coloring agent

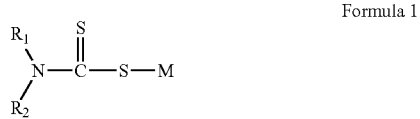

Formula 1 where $R_1$ and $R_2$ are each independently, hydrogen, a $C_1$-$C_{20}$ substituted or unsubstituted alkyl, a $C_2$-$C_{20}$ substituted or unsubstituted alkenyl, a $C_2$-$C_{20}$ substituted or unsubstituted alkynyl, a $C_6$-$C_{20}$ substituted or unsubstituted aryl, a $C_7$-$C_{20}$ substituted or unsubstituted arylalkyl, a $C_2$-$C_{20}$ substituted or unsubstituted cyclic alkyl, or a hetero atom-containing cyclic alkyl and M is hydrogen or Na, K, Li, or an ammonium ion.

The foregoing and/or other aspects and utilities of the general inventive concept may also be achieved by providing an inkjet printhead including a plurality of nozzles, and an ink chamber including a plurality of heaters corresponding to the plurality of nozzles, and ink to prevent depositions from forming on the heaters and in the nozzles, wherein the ink comprises a coloring agent, water; and a compound represented by Formula 1, wherein an amount of the compound represented by Formula 1 is in a range from 0.0001 to 0.005 parts by weight based on 1 part by weight of the coloring agent

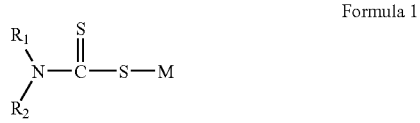

Formula 1 where $R_1$ and $R_2$ are each independently, hydrogen, a $C_1$-$C_{20}$ substituted or unsubstituted alkyl, a $C_2$-$C_{20}$ substituted or unsubstituted alkenyl, a $C_2$-$C_{20}$ substituted or unsubstituted alkynyl, a $C_6$-$C_{20}$ substituted or unsubstituted aryl, a $C_7$-$C_{20}$ substituted or unsubstituted arylalkyl, a $C_2$-$C_{20}$ substituted or unsubstituted cyclic alkyl, or a hetero atom-containing cyclic alkyl and M is hydrogen or Na, K, Li, or an ammonium ion.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
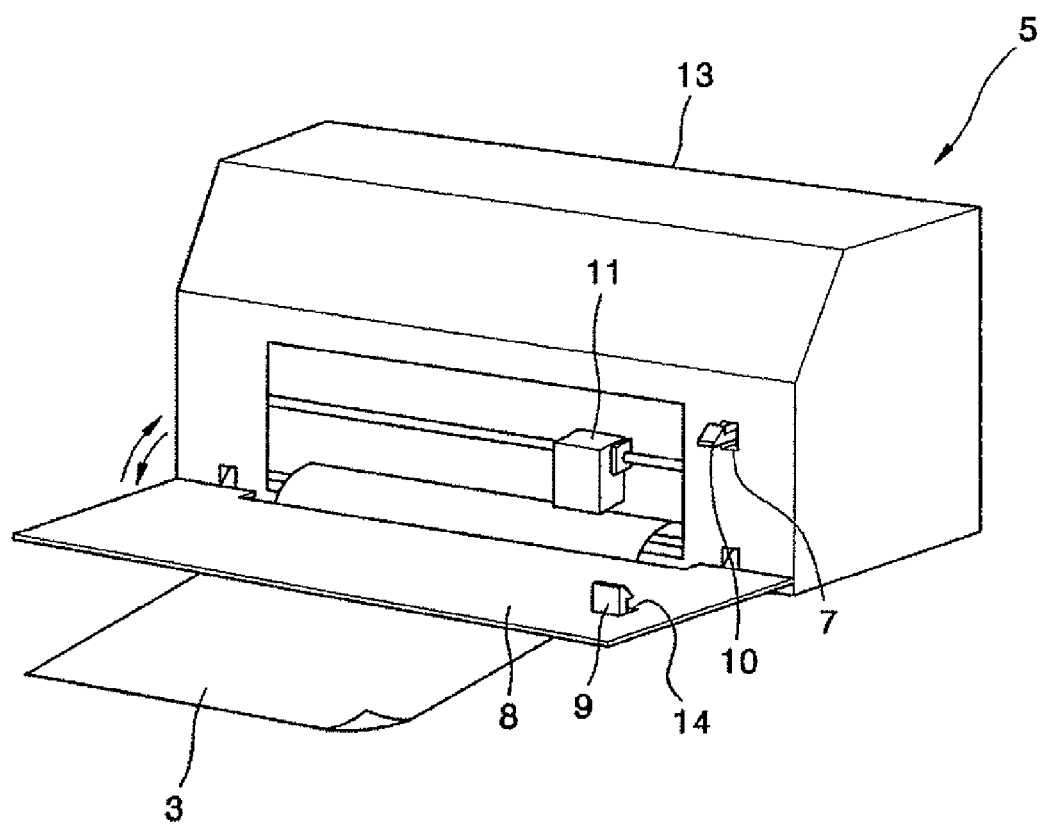
FIG. 1 is a perspective view illustrating an inkjet recording apparatus including an ink cartridge including an ink composition for inkjet recording including a coloring agent, water, and a compound represented by Formula 1 according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

An ink for inkjet recording according to an exemplary embodiment of the present general inventive concept includes a coloring agent and a solvent, wherein the solvent includes a chelating agent which is soluble with respect to the solvent. Herein, the expression "soluble with respect to the solvent" carries the meaning that the chelating agent is dissolved in a solvent to such a degree that the chelating agent captures a metal ion eluted in the ink.

The chelating agent may be a compound represented by Formula 1:

Formula 1 where $R_1$ and R2 are each independently, hydrogen, a C1-C20 substituted or unsubstituted alkyl, a C2-C20 substituted or unsubstituted alkenyl, a C2-C20 substituted or unsubstituted alkynyl, a C6-C20 substituted or unsubstituted aryl, a C7-C20 substituted or unsubstituted arylalkyl, a C2-C20 substituted or unsubstituted cyclic alkyl, or a hetero atom-containing cyclic alkyl; and M is hydrogen or Na, K, Li, or an ammonium ion.

In the present embodiment, each substitutent described above is defined as follows.

The alkyl refers to a linear or branched saturated monovalent hydrocarbon group having one of 1-20, 1-10, and 1-6 carbon atoms. The unsubstituted alkyl used according to the present embodiment can be methyl, ethyl, propyl, isobutyl, sec-butyl, tert-butyl, pentyl, iso-amyl, or hexyl. In the alkyl, at least one hydrogen atom can be substituted with a halogen atom; a hydroxy group; a nitro group; a cyano group; a substituted or unsubstituted amino group, such as —NH2, —NH (R), or —N(R')(R") where R' and R" are each independently C1-10 alkyl; an amidino group; a hydrazine or hydrazone group; a carboxylic group; a sulfonic acid; a phosphoric acid group; C1-C20 alkyl; C1-C20 halogenized alkyl; C2-C20 alkenyl; C2-C20 alkynyl; C1-C20 heteroalkyl; C6-C20 aryl; C6-C20 arylalkyl; C6-C20 heteroaryl; or C6-C20 heteroarylalkyl.

The alkenyl refers to a linear or branched monovalent hydrocarbon group containing at least one C—C double bond and having one of 2-20, 2-10, and 2-6 carbon atoms. The alkenyl can be bonded through a carbon atom having a C—C double bond or through a saturated carbon atom. The alkenyl can be substituted with one or more halogen substituent. The alkenyl can be ethenyl, 1-propenyl, 2-propenyl, 2-butenyl, 3-butenyl, pentenyl, 5-hexenyl, or dodecenyl.

The alkynyl refers to a linear or branched monovalent hydrocarbon group including one or more C—C triple bond having one of 2-20, 2-10, and 2-6 carbon atoms. The linear or branched alkynyl can be acetyrenyl, propynyl, 1-butynyl, 2-butynyl, 1-pentynyl, 2-pentynyl, 3-methyl-1-butynyl, 4-pentynyl, 1-hexynyl, 2-hexynyl, 5-hexynyl, 1-heptynyl, 2-heptynyl, 6-heptynyl, 1-octynyl, 2-octynyl, 7-octynyl, 1-nonynyl, 2-nonynyl, 8-nonynyl, 1-decynyl, 2-decynyl, or 9-decynyl.

The aryl refers to monovalent monocyclic, bicyclic or tricyclic aromatic hydrocarbon group having one of 6-20, and 6-18 cyclic carbon atoms. The aryl can be substituted with one or more halogen substituents. In the aryl, an aromatic part includes only carbon atoms. The aryl can be phenyl, naphtalenyl or fluorenyl, and in the aryl, at least one hydrogen atom can be substituted with such substituents as in the case of the alkyl previously described.

The arylalkyl refers to the aryl described above having hydrogen atoms substituted with a lower alkyl, such as methyl, ethyl, or propyl. The arylalkyl can be benzyl or phenylethyl. In the arylalkyl, one or more hydrogen atoms can be substituted with such substituents as in the case of the alkyl previously described.

The cyclic alkyl refers to a monovalent monocyclic system having one of 3-20, 3-10, and 3-6 carbon atoms. In the cyclic alkyl, at least one hydrogen atom can be substituted with such substituents as in the case of the alkyl previously described.

The cyclic alkyl having a hetero atom refers to a monovalent monocyclic system having 1, 2 or 3 heteroatoms selected from N, O, P and S and having one of 3-20, 3-10, and 3-6 carbon atoms. In the cyclic alkyl, one or more hydrogen atom can be substituted with such substituents as in the case of the alkyl previously described.

The amino group can be —NH2, —NH(R) or —N(R')(R") where R' and R" are each independently C1-C10 alkyl.

The halogen can be F, Cl, Br, I, or At. For example, the halogen is F.

An ink for inkjet recording according to the present embodiment includes a coloring agent and a solvent, wherein the solvent includes a chelating agent that is soluble with respect to the solvent. As a result, metal atom ions from the coloring agent or a derivative of the coloring agent, or impurities generated when the coloring agent is synthesized, or a container and an ink path are captured by the chelating agent and a resultant product can be dissolved in the solvent. Accordingly, the metal atom ion is not deposited in ink, and thus, formation of depositions over time can be prevented and further the ink can obtain high storage stability and good ejection properties.

Furthermore, there is no need to limit a coloring agent used, to refine a coloring agent to increase its purity, or to use a solvent that causes less elution of a metal atom ion from a container or an ink path.

The chelating agent can be a dithiocarbamate compound represented by Formula 1.

Examples of the dithiocarbamate compound represented by Formula 1 used in the ink composition for inkjet recording according to the present embodiment include a dimethyldithiocarbamic acid sodium salt represented by Formula 2, a diethyldithiocarbamic acid sodium salt represented by Formula 3, sodium pyrrolidinedithiocarbamate represented by Formula 4, sodium 1-piperidinecarbodithioate represented by Formula 5, sodium 4-morpholinecarbodithioate represented by Formula 6, and derivatives thereof:

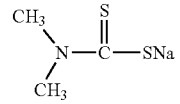

Formula 2

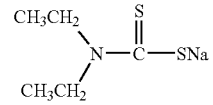

Formula 3

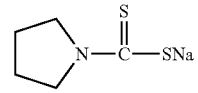

Formula 4

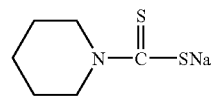

Formula 5

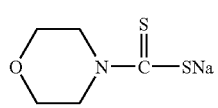

Formula 6

These dithiocarbamate compounds can be used alone or in combination.

In the composition for inkjet recording according to the present embodiment, an amount of the compound represented by Formula 1 may be in a range from 0.0001 to 0.005 parts by weight, such as 0.0005 to 0.003 parts by weight, based on 1 part by weight of the coloring agent.

When the amount of the compound represented by Formula 1 is less than 0.0001 parts by weight, formation of depositions cannot be completely prevented. Alternatively, when the amount of the compound represented by Formula 1 is more than 0.005 parts by weight, solid deposits are formed and may plug nozzles, so that ink may not be smoothly ejected from the nozzles of an inkjet head.

The ink composition for inkjet recording according to the present embodiment includes water that acts as a solvent. The amount of water may be in a range from 5 to 100 parts by weight based on 1 part by weight of the coloring agent. When the amount of water is less than 5 parts by weight, the ink composition may have high viscosity which makes it difficult to eject. Alternatively, when the amount of water is more than 100 parts by weight, such effects as penetrability, dot forming ability, and drying property of a printed image on a recording medium such as a standard sheet or a professional sheet cannot be obtained since it is difficult to control a surface tension of ink.

The ink composition may further include a water-soluble organic solvent. The amount of the water-soluble organic solvent may be in a range from 0.1-50 parts by weight based on 1 part by weight of the coloring agent. When the amount of the water-soluble organic solvent is less than 0.1 parts by weight, such effects as penetrability, dot forming ability, and drying property of a printed image on a recording medium such as a standard sheet or a professional sheet cannot be obtained since it is difficult to control the surface tension of ink. Alternatively, when the amount of the water-soluble organic solvent is more than 50 parts by weight, the ink composition may have high viscosity which makes it difficult to eject. The water-soluble organic solvent can be an aliphatic monovalent alcohol, a polyvalent alcohol, or a derivative of the polyvalent alcohol. When the ink composition further includes the water-soluble organic solvent, a weight ratio of water to the water-soluble organic solvent may be in a range from 1:0.02 to 1:1.

An aliphatic monovalent alcohol can enhance penetrability, dot forming ability and drying property of a printed image on a recording medium such as a standard sheet or a professional sheet by controlling the surface tension of the ink composition. The polyvalent alcohol and a derivative thereof do not easily evaporate and decreases the freezing point of the ink composition to improve storage stability of the ink composition, thereby preventing plugging of nozzles.

The aliphatic monovalent alcohol can be a C1-C10 lower alcohol, such as methyl alcohol, ethyl alcohol, n-propyl alcohol, i-propyl alcohol, n-butyl alcohol, s-butyl alcohol or t-butyl alcohol. For example, the aliphatic monovalent alcohol can be ethyl alcohol, i-propyl alcohol, or n-butyl alcohol.

The polyvalent alcohol can be alkyleneglycols, such as ethyleneglycol, diethyleneglycol, triethyleneglycol, propyleneglycol, butyleneglycol, and glycerol; polyalkyleneglycols, such as polyethyleneglycol and polypropyleneglycol; thiodigylcols; or a blend thereof.

Examples of the polyvalent alcohol derivative include a lower alkylether of the polyvalent alcohol described above, and a lower carboxylic acid ester of the polyvalent alcohol described above. Specifically, the lower alkylethers of the polyvalent alcohol can be ethyleneglycoldimethylether, and a lower carboxylic acid ester of the polyvalent alcohol can be ethyleneglycoldiacetate.

A coloring agent used according to the present embodiment can be a self-dispersing dye, a self-dispersing pigment or a conventional pigment or dye conventionally used as a dispersant. The coloring agent can be C.I. Basic Black 2, C.I. Direct Yellow 44, C.I. Basic Blue 26, C.I. Direct Red 227 or Projet Fast Cyan 2 (Zeneca Co.), Projet Fast Magenta 2 (Zeneca Co.), Projet Fast Yellow 2 (Zeneca Co.), or Projet Fast Black 2 (Zeneca Co.), but is not limited thereto.

The ink composition for inkjet recording according to the present embodiment may further include other additives, such as a surfactant, a pH controlling agent, an antiseptic, or a chelating agent. Herein, the amount of all of the additives further included in the ink composition may be in a range from 0.01-2 parts by weight based on 1 part by weight of the coloring agent.

The ink composition for inkjet recording according to the present embodiment can be prepared by uniformly mixing dye, water, and a water-soluble organic solvent using a conventional technique. A use of the water-soluble organic solvent is optional.

The ink composition for inkjet recording according to the present embodiment can be used in a wide range of applications. For example, the ink composition can be used in, in addition to an ink composition, a toner, various types of paints, or coating solutions. Specifically, the ink composition can be used in an inkjet printer cartridge including an array head.

Unlike a shuttle-type inkjet printer which performs recording by transferring a single chip, an inkjet printer including an array head performs recording very quickly using a plurality of chips so that a throughput of a printer can be increased.

An inkjet recording apparatus according to the present embodiment includes the ink cartridge including the ink composition for inkjet recording described above. FIG. 1 is a perspective view illustrating an inkjet recording apparatus according to an embodiment of the present general inventive concept.

Referring to FIG. 1, an inkjet recording apparatus according to the present embodiment includes an ink cartridge including the ink composition for inkjet recording which includes a coloring agent, water, and a compound represented by Formula 1. A printer cover 8 is connected to a body 13 of a printer 5 by a hinge. An engaged region of a movable latch 10 protrudes through a hole 7. The movable latch 10 is engaged with a fixed latch 9. When the printer cover 8 is closed, the movable latch 10 is engaged with the fixed latch 9, and the fixed latch 9 contacts the movable latch 10 inside of the printer cover 8. The printer cover 8 has a recess 14 corresponding to the engaged portion of a movable latch 10 extending through the hole 7. The ink cartridge 11 is located such that ink is discharged on a recording medium such as a sheet of paper 3 passing under the ink cartridge 11.

Figure 2:
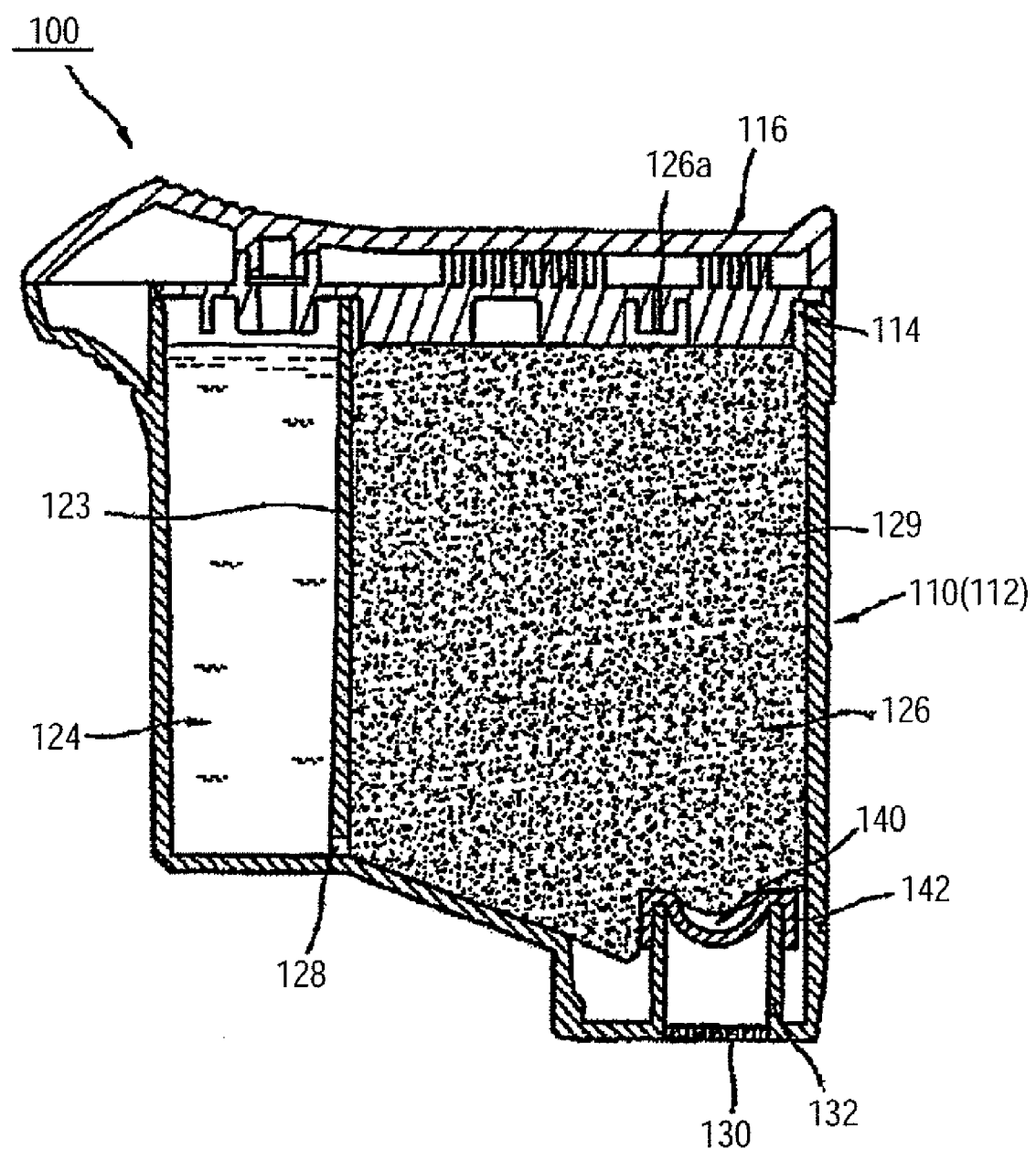
FIG. 2 is a horizontal and sectional view illustrating an ink cartridge including an ink composition for inkjet recording including a coloring agent, water, and a compound represented by Formula 1 according to another embodiment of the present general inventive concept.

FIG. 2 is a horizontal and sectional view illustrating an ink cartridge 100 including an ink composition for inkjet recording which includes a coloring agent, water, and a compound represented by Formula 1 according to another embodiment of the present general inventive concept.

Referring to FIG. 2, the cartridge 100 includes an ink cartridge body 110 forming an ink container 112, an inner cover 114 covering the ink container 112, and an outer cover 116 separated from the inner cover 114 by a predetermined distance to seal the ink container 112 and the inner cover 114.

The ink container 112 is divided into first and second chambers 124 and 126 by a vertical barrier 123. An ink path 128 between the first and second chamber 124 and 126 is formed at the lowest portion of the vertical barrier 123. The first chamber 124 is filled with ink, and the second chamber 126 is filled with a sponge 129 and ink. A vent hole 126a corresponding to the second chamber 126 is formed on the inner cover 114.

A filter 140 is located in a lower portion of the second chamber 126 to filter the impurities and fine bubbles of ink so as to prevent plugging of a print head nozzle 130. A hook 142 is located on an edge of the filter 140 and on a higher portion of a standpipe 132. Ink is ejected in the form of droplets to a printing medium from the ink container 112 through the print head nozzle 130.

The present general inventive concept will be described in further detail with reference to the following examples. These examples are for illustrative purposes only and are not intended to limit the scope of the present general inventive concept.

Compounds given according to Examples 1-4 were completely mixed using a mixer to prepare ink compositions for inkjet recording according to Examples 1-4.

Example 1

| | |
|---|---|
| C.I. Basic Black 2 | 4.5 parts by weight |
| glycerol | 7.5 parts by weight |
| diethyleneglycol | 12.0 parts by weight |
| dimethyldithiocarbamic acid sodium | 0.006 parts by weight |
| water (deionized water) | 76 parts by weight |

Example 2

| | |
|---|---|
| C.I. Direct Yellow 44 | 4.0 parts by weight |
| glycerol | 9.5 parts by weight |
| diethyleneglycol | 5.5 parts by weight |
| ethyleneglycol | 4.5 parts by weight |
| diethyldithiocarbamic acid sodium | 0.005 parts by weight |
| water (deionized water) | 76.5 parts by weight |

Example 3

| | |
|---|---|
| C.I. Basic Blue 26 | 4.5 parts by weight |
| diethyleneglycol | 9.5 parts by weight |
| ethyleneglycol | 10.5 parts by weight |

-continued

| | | |
|---|---|---|
| sodium pyrrolidinedithiocarbamate | 0.009 | parts by weight |
| water (deionized water) | 75.5 | parts by weight |

Example 4

| | | |
|---|---|---|
| C.I. Direct Red 227 | 3.5 | parts by weight |
| glycerol | 10.5 | parts by weight |
| diethyleneglycol | 4.5 | parts by weight |
| ethyleneglycol | 5.5 | parts by weight |
| sodium 1-piperidinecarbodithioate | 0.006 | parts by weight |
| water (deionized water) | 76 | parts by weight |

Compounds given according to Comparative Examples 1-4 were completely mixed using a mixer to prepare ink compositions for inkjet recording according to Comparative Examples 1-4.

Comparative Example 1

| | | |
|---|---|---|
| C.I. Basic Black 2 | 4.5 | parts by weight |
| glycerol | 7.5 | parts by weight |
| diethyleneglycol | 12.0 | parts by weight |
| water (deionized water) | 76 | parts by weight |

Comparative Example 2

| | | |
|---|---|---|
| C.I. Direct Yellow 44 | 4.0 | parts by weight |
| glycerol | 9.5 | parts by weight |
| diethyleneglycol | 5.5 | parts by weight |
| ethyleneglycol | 4.5 | parts by weight |
| diethyldithiocarbamic acid sodium | 0.0001 | parts by weight |
| water (deionized water) | 76.5 | parts by weight |

Comparative Example 3

| | | |
|---|---|---|
| C.I. Basic Blue 26 | 4.5 | parts by weight |
| diethyleneglycol | 9.5 | parts by weight |
| ethyleneglycol | 10.5 | parts by weight |
| sodium pyrrolidinedithiocarbamate | 1.8 | parts by weight |
| water (deionized water) | 75.5 | parts by weight |

Comparative Example 4

| | | |
|---|---|---|
| C.I. Direct Red 227 | 3.5 | parts by weight |
| glycerol | 10.5 | parts by weight |
| diethyleneglycol | 4.5 | parts by weight |
| ethyleneglycol | 5.5 | parts by weight |
| water (deionized water) | 76 | parts by weight |

Measurements

Plugging of Nozzle

Among the ink composition for inkjet recording obtained according to Examples 1-4 and Comparative Examples 1-4, color ink was loaded to an ink cartridge C-60 (Samsung Electronics Co., Ltd.) and black ink was loaded to an ink cartridge M-50 (Samsung Electronics Co., Ltd.). These ink cartridges were left to sit at room temperature (25° C.) for two weeks and at a low temperature (−18° C.) for another two weeks, and then, the number of times nozzle cleaning was required to be performed in order to allow normal printing was measured. The results are illustrated in Table 1.

A: Normal printing was performed after nozzle cleaning was performed once

B: Normal printing was performed after nozzle cleaning was performed 2 through 4 times C: Normal printing was performed after nozzle cleaning was performed 5 through 10 times D: Normal printing could not be performed even when nozzle cleaning was performed as much as 10 times Decrease in Ejection Speed Each of the ink compositions for inkjet recording prepared according to Examples 1-4 and Comparative Examples 1-4 was loaded to an inkjet printer including a heating device and then ejected to a standard sheet of paper. The initial ejection speed of an ink droplet, and the ejection speed of an ink droplet after 100,000,000 pulses were measured to identify a change in the ejection speed, that is, a decrease in the ejection speed (%). Results are illustrated in Table 1.

State of Cogation

After 100,000,000 pulses, formation of depositions on a surface of a thermal device, that is, state of cogation was identified using an optical microscope. In Table 1, "A" denotes when depositions do not exist at the surface of the heating device, "B" denotes when depositions exist in trace amounts at the surface of the heating device, and "C" denotes when depositions do exist in an effective amount at the surface of the heating device. Results are illustrated in Table 1.

TABLE 1

| | Plugging of Nozzle | Decrease in Ejection Speed (%) | State of Cogation |
|---|---|---|---|
| Example 1 | A | 13 | A |
| Example 2 | A | 10 | B |
| Example 3 | B | 15 | A |
| Example 4 | B | 11 | A |
| Comparative Example 1 | C | 91 | C |
| Comparative Example 2 | C | 45 | C |
| Comparative Example 3 | C | 59 | C |
| Comparative Example 4 | C | 38 | C |

Referring to Table 1, when the inkjet printing was performed using the ink compositions for inkjet recording prepared according to Examples 1-4, each of which includes the compound represented by Formula 1, nozzle plugging was reduced. After 100,000,000 pulses, a decrease in ejection speed was less than 20%. Accordingly, it was identified that the ink compositions for inkjet recording prepared according to Examples 1-4 were suitable for practical use. When inkjet printing was performed using the ink compositions for inkjet recording prepared Examples 1, 3, and 4, the surface of the heating device was not substantially colored.

Alternatively, when inkjet printing was performed using the ink compositions for inkjet recording prepared according to Comparative Examples 1-4, the nozzle was plugged to a high degree, and after 100,000,000 pulses, the decrease in ejection speed was more than 20%. Accordingly, it was identified that the ink compositions for inkjet recording prepared according to Comparative Examples 1-4 were not suitable for practical use. Specifically, in the case of the ink composition prepared according to Comparative Example 2, cogation occurred significantly and a great amount of depositions were formed at the surface of the heating device of a printer nozzle. In the case of the ink composition prepared according to Comparative Example 3, the ink composition could not be ejected since the nozzle was completely plugged with solid depositions.

Such results illustrate that when the ink composition for inkjet recording including the compound represented by Formula 1, according to the present general inventive concept, is used in a thermal inkjet printer head, nozzle plugging and cogation, that is, deposition of impurities at a surface of a heating device can be prevented.

An ink for inkjet recording according to various embodiments of the present general inventive concept can prevent plugging of a nozzle and formation of cogation when used for thermal inkjet recording so that ink droplets can be stably ejected from an inkjet printer head for a long period of time.

Although various embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An ink composition for inkjet recording, comprising:
a coloring agent;
water; and
a compound represented by Formula 1,
wherein an amount of the compound represented by Formula 1 is in a range from 0.0001 to 0.005 parts by weight based on 1 part by weight of the coloring agent:

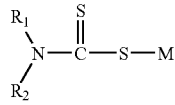

Formula 1 where $R_1$ and $R_2$ are each independently, hydrogen, a $C_1$-$C_{20}$ substituted or unsubstituted alkyl, a $C_2$-$C_{20}$ substituted or unsubstituted alkenyl, a $C_2$-$C_{20}$ substituted or unsubstituted alkynyl, a $C_6$-$C_{20}$ substituted or unsubstituted aryl, a $C_7$-$C_{20}$ substituted or unsubstituted arylalkyl, a $C_2$-$C_{20}$ substituted or unsubstituted cyclic alkyl, or a hetero atom-containing cyclic alkyl; and M is hydrogen or Na, K, Li, or an ammonium ion.

2. The ink composition of claim 1, wherein:
the compound represented by Formula 1 is selected from the group consisting of a dimethyldithiocarbamic acid sodium salt represented by Formula 2, a diethyldithiocarbamic acid sodium salt represented by Formula 3, sodium pyrrolidinedithiocarbamate represented by Formula 4, sodium 1-piperidinecarbodithioate represented by Formula 5, sodium 4-morpholinecarbodithioate represented by Formula 6, derivatives thereof, and a blend thereof:

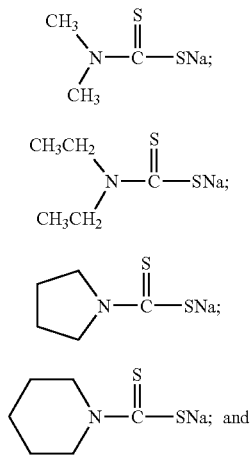

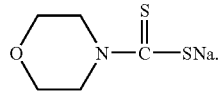

3. An ink cartridge, comprising:
a storing portion to store ink; and
the ink comprising:
a coloring agent;
water; and
a compound represented by Formula 1,
wherein an amount of the compound represented by Formula 1 is in a range from 0.0001 to 0.005 parts by weight based on 1 part by weight of the coloring agent:

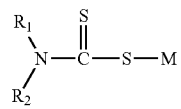

Formula 1 where $R_1$ and $R_2$ are each independently, hydrogen, a $C_1$-$C_{20}$ substituted or unsubstituted alkyl, a $C_2$-$C_{20}$ substituted or unsubstituted alkenyl, a $C_2$-$C_{20}$ substituted or unsubstituted alkynyl, a $C_6$-$C_{20}$ substituted or unsubstituted aryl, a $C_7$-$C_{20}$ substituted or unsubstituted arylalkyl, a $C_2$-$C_{20}$ substituted or unsubstituted cyclic alkyl, or a hetero atom-containing cyclic alkyl; and M is hydrogen or Na, K, Li, or an ammonium ion.

4. An inkjet recording apparatus, comprising:
an ink cartridge to store and discharge ink; and
the ink comprising:
a coloring agent;
water; and
a compound represented by Formula 1,
wherein an amount of the compound represented by Formula 1 is in a range from 0.0001 to 0.005 parts by weight based on 1 part by weight of the coloring agent:

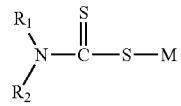

Formula 1 where $R_1$ and $R_2$ are each independently, hydrogen, a $C_1$-$C_{20}$ substituted or unsubstituted alkyl, a $C_2$-$C_{20}$ substituted or unsubstituted alkenyl, a $C_2$-$C_{20}$ substituted or unsubstituted alkynyl, a $C_6$-$C_{20}$ substituted or unsubstituted aryl, a $C_7$-$C_{20}$ substituted or unsubstituted arylalkyl, a $C_2$-$C_{20}$ substituted or unsubstituted cyclic alkyl, or a hetero atom-containing cyclic alkyl; and M is hydrogen or Na, K, Li, or an ammonium ion.

5. An inkjet printhead, comprising:
a plurality of nozzles; and
an ink chamber including a plurality of heaters corresponding to the plurality of nozzles, and ink to prevent depositions from forming on the heaters and in the nozzles,
wherein the ink comprises:
a coloring agent;
water; and
a compound represented by Formula 1, wherein an amount of the compound represented by Formula 1 is in a range from 0.0001 to 0.005 parts by weight based on 1 part by weight of the coloring agent:

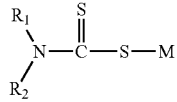

Formula 1 where $R_1$ and $R_2$ are each independently, hydrogen, a $C_1$-$C_{20}$ substituted or unsubstituted alkyl, a $C_2$-$C_{20}$ substituted or unsubstituted alkenyl, a $C_2$-$C_{20}$ substituted or unsubstituted alkynyl, a $C_6$-$C_{20}$ substituted or unsubstituted aryl, a $C_7$-$C_{20}$ substituted or unsubstituted arylalkyl, a $C_2$-$C_{20}$ substituted or unsubstituted cyclic alkyl, or a hetero atom-containing cyclic alkyl; and M is hydrogen or Na, K, Li, or an ammonium ion.

6. The ink composition of claim 1, wherein the amount of the water is in a range from 5 to 100 parts by weight based on 1 part by weight of the coloring agent.

7. The ink composition of claim 1, further comprising:
a water-soluble organic solvent.

8. The ink composition of claim 7, wherein the water-soluble organic solvent is a in a range from 0.1-50 parts by weight based on 1 part by weight of the coloring agent.

9. The ink composition of claim 7, wherein a weight ratio of the water to the water-soluble organic solvent is in a range from 1:0.02 to 1:1.

10. The ink composition of claim 7, where the water-soluble organic solvent is an aliphatic monovalent alcohol, a polyvalent alcohol, or a derivative of the polyvalent alcohol.

11. The ink composition of claim 1, further comprising:
an additive having a surfactant, a pH controlling agent, an antiseptic, or a chelating agent, or any combination thereof.

12. The ink composition of claim 11, wherein the additive is in a range from 0.01-2 parts by weight based on 1 part by weight of the coloring agent.

* * * * *